United States Patent

Lin

Patent Number: 6,081,847
Date of Patent: Jun. 27, 2000

[54] SYSTEM AND METHOD FOR EFFICIENT INITIALIZATION OF A RING NETWORK

[75] Inventor: Mark Lin, Oakland, Calif.

[73] Assignee: LSI Logic Corporation, Milpitas, Calif.

[21] Appl. No.: 09/031,797

[22] Filed: Feb. 27, 1998

[51] Int. Cl.$^7$ .................................................. G06F 13/00
[52] U.S. Cl. ......................................... 709/250; 370/282
[58] Field of Search .................................... 709/200, 201, 709/220, 221, 223, 224, 225, 250, 251; 370/282, 463

[56] References Cited

U.S. PATENT DOCUMENTS

| | | | |
|---|---|---|---|
| 5,010,479 | 4/1991 | Mori et al. | 709/218 |
| 5,687,316 | 11/1997 | Graziano et al. | 709/250 |
| 5,764,638 | 6/1998 | Ketchum | 370/401 |
| 5,949,787 | 9/1999 | Wegner et al. | 370/428 |

*Primary Examiner*—Moustafa M. Meky
*Attorney, Agent, or Firm*—Conley, Rose & Tayon, PC; B. Noel Kivlin

[57] ABSTRACT

A Fibre Channel network is provided with an efficient implementation of the loop initialization process. In one embodiment, the network comprises nodes coupled by unidirectional serial communications links in a ring topology. The nodes typically include a serial communications transceiver, a transmit controller, a receive controller, and a memory unit. The serial communications transceiver operates to drive transmit signals on the outgoing serial communications link and to buffer receive signals from the incoming serial communications link. The memory unit includes transmit and receive buffers that are coupled to the transceiver via transmit and receive controllers. One or more of the nodes may also include a control register having an "autoswap" bit. The autoswap bit is initially reset to 0 when the node enters the initialization mode. When the autoswap bit is set to 1, the transmit and receive buffers exchange roles after every data frame so that received initialization data frames stored in the receive buffer are retransmitted by the transmitter controller. When the autoswap bit is not set, a comparison between the original transmitted initialization data frame and the received initialization data frame is performed, and if it is determined that the received initialization data frame is less than the original transmitted initialization frame, the autoswap bit is set. Otherwise a check is made to determine if the two frames are equal, in which case the node determines that it has received its original transmitted initialization data frame and assumes the role of Loop Initialization Master. If the received initialization data frame is neither less than or equal to the original frame, then the original initialization data frame is retransmitted, and the cycle is repeated with the next received frame. This implementation advantageously reduces the retransmission latency of nodes in the loop and thereby reduces the propagation delay of the smallest initialization data frame around the loop, resulting in a smaller loop initialization time.

15 Claims, 3 Drawing Sheets

SYSTEM AND METHOD FOR EFFICIENT INITIALIZATION OF A RING NETWORK

BACKGROUND OF THE INVENTION

1. Field of the Invention

This invention relates to the field of computer networking, and in particular to an efficient implementation of a loop initialization process.

2. Description of the Related Art

Internetworking of high-performance computers has become the focus of much attention in the data communications industry. Performance improvements in processors and peripherals, along with the move to distributed architectures such as client/server, have spawned increasingly data-intensive and high-speed networking applications, such as medical imaging, multimedia, and scientific visualization. However, the interconnections between the systems and their input/output devices cannot keep up with the blinding data rates, nor can they provide the distances needed for local area networks spanning campus-wide areas.

According to "Amdahl's Law", a megabit per second of input/output (I/O) capability is needed for every MIPS of processor performance. Current communications standards top out at just over 100 megabits per second, not nearly fast enough, as technical computing applications already demand processors exceeding 1,000 MIPS. The deficiencies in current transmission rates results in the communications channel becoming a bottleneck to system performance.

A new protocol known as Fibre Channel is 10 to 250 times faster than existing networks, transmitting at rates exceeding 1 Gbps in both directions simultaneously. It defines standard media and signaling conventions for transporting data in a serial fashion, it provides an error correcting channel code and a frame structure for transporting the data, it sets out a flow control methodology, creates some common services, and supports interfaces to existing higher level protocols such as SCSI (small computer system interface). The Fibre Channel protocol can be applied to various network topologies including point-to-point, ring, and switched. The Fibre Channel protocol is being proposed as an ANSI (American National Standards Institute, Inc.) standard, and a multitude of reference material is readily available at http://www.fibrechannel.com.

Communication across the Fibre Channel is provided using data frames. Consecutive data frames travelling in one direction form a sequence, and a group of related sequences combines to form an exchange. The higher level protocols supported by Fibre Channel perform "operations" such as: open, read, write, close, etc. An exchange may correspond to one of these operations. Each active sequence in an exchange is provided with a unique sequence identifier.

Data frames are separated by approximately six Transmission Words which serve multiple functions. The Transmission Words are drawn from a set of primitive signals which includes IDLE, ARBx and LIP. IDLE signals are fill words. ARBx signals indicate that a port x desires control of the loop. LIP signals indicate that a port wants to take the loop through the initialization process and obtain a loop address. To allow for different reception and transmission data rates, the number of Transmission Words between data frames can be adjusted. For example if the transmitter is transmitting at a slightly higher data rate than the rate at which data is being received, then the transmitter may occasionally insert an additional Transmission Word between data frames to allow more time for data to be received.

At power-up and after loop resets due to errors, the loop begins an initialization process. Each of the ports functions according to a Loop Port State Machine (LPSM) such as that shown in FIG. 1. When an event occurs (e.g. a loop reset), the port enters INITIALIZING state 12. INITIALIZING state 12, the port sends LIP Transmission Words continuously until it detects a LIP Transmission Word. Upon detecting a LIP Transmission Word the port enters OPEN-INIT state 14. In OPEN-INIT state 14, the port sends Loop Initialization Select Master (LISM) data frames to select a port on the loop to be the Loop Initialization Master. The manner in which this occurs will be discussed further below. While in this state each port determines whether it is the Loop Initialization Master. If a port determines that it is Loop Initialization Master, it initiates the remaining steps for determining loop addresses for each of the loop ports. Once these steps have been completed, the Loop Initialization Master sends a CLS Transmission Word to indicate to each of the ports that the initialization process is complete. Upon receiving the CLS Transmission Word, each of the ports enters the MONITORING state 16.

In MONITORING state 16 a port for the most part simply re-transmits everything it receives until one of two things happens: (1) it detects an OPNx Transmission Word where x is the port's loop address, or (2) it determines that it needs access to the loop. In the first case, the port transitions to OPENED state 28. In the second case, the port transitions to ARBITRATING state 18.

In ARBITRATING state 18, a port begins transmitting ARBx Transmission Words, and continues until it receives an ARBy Transmission Word. At this point, if y=x, then the port transitions to the ARBITRATION WON state 20. If y<x, the port begins re-transmitting the ARBy Transmission Words. Otherwise, the port ignores the ARBy Transmission Word.

Upon reaching the ARBITRATION WON state 20, the port determines if the reason for access was to perform a data exchange or to become a non-participant on the loop. In the former case, the port transmits an OPNy Transmission Word to open a connection to a remote node y, and transitions to the OPEN state 24. In the latter case, the port places itself in a bypass mode, and re-enters MONITORING state 16.

In OPEN state 24, the port begins sending data frames to transfer any outgoing data to the remote node. This continues until the port has exhausted all buffer credits from the remote node or until all outgoing data has been sent. The port concludes the outgoing data with a CLS Transmission Word. If during the transfer of data the port receives a CLS Transmission Word, it enters the RECEIVED CLOSE state 26. Otherwise, if the port is expecting a transfer of data from the remote node, or wishes to conduct an exchange with another remote node, the port enters the TRANSFER state 22, otherwise the port enters the XMITTED CLOSE state 30. After the remote node finishes sending data frames, it will send a CLS Transmission Word. From the XMITTED CLOSE state 30, when the port receives the CLS Transmission Word, it will return to the MONITORING state 16.

After the port receives a CLS Transmission Word in the TRANSFER state 22, if it wishes to conduct an exchange with another remote node, it sends an OPNy Transmission Word to the new remote node, and enters OPEN state 24. Otherwise, the port returns to the MONITORING state 16.

In the RECEIVED CLOSE state 26, the port continues to transmit data frames until all buffer credits are exhausted or until all the outgoing data has been sent. The port then transmits a CLS Transmission Word and returns to the MONITORING state 16.

In the OPENED state 28, the port transmits data frames until all buffer credits are exhausted or until all the outgoing data has been sent. The port concludes the outgoing data with a CLS Transmission Word. If during the transfer of data, the port receives a CLS Transmission Word, it enters the RECEIVED CLOSE state 26. Otherwise, after transmitting a CLS Transmission Word, the port moves to the XMITTED CLOSE state 30. In the XMITTED CLOSE state 30, after CLS Transmission Word is received, the port returns to the MONITORING state 26.

During the loop initialization procedure, each node is assigned an arbitrated loop physical address (ALPA) from a pool of 127 available addresses. This occurs in the following manner. While in the OPEN-INIT state, each port begins transmitting LISM data frames. Initially, the LISM data frames include three fields: D_ID, S_ID, and Port Name. The first two fields are three bytes long, and the Port Name is eight bytes long. The values of these fields are determined by firmware and they are used to determine priority. In comparing LISM frames, the LISM frame with smaller D_ID value is algebraically lower. If the D_ID values are equal, then the LISM frame with the smaller S_ID value is algebraically lower. If both the S_ID and D_ID values are equal, then the LISM frame with the smaller Port Name is algebraically lower.

During the initialization procedure, the ports compare any received LISM frames to their current LISM frames. If the received LISM frame is algebraically lower than the current LISM frame, the received LISM becomes the current LISM frame which the port re-transmits. Algebraically higher LISM frames are ignored and not retransmitted. When the received LISM frame is equal to the port's original LISM frame, this is taken as an indication that the port's LISM frame has made it all the way around the loop and the originating port has the lowest LISM frame. This in causes the originating port to assume the role of Loop Initialization Master. The Loop Initialization Master assumes control of the loop by transmitting an ARB Transmission Word. Once the ARB Transmission Word has completed its circuit of the loop, the Loop Initialization Master begins an iterative procedure for determining ALPAs for all the active ports on the loop.

It is desirable for all loop interactions by a port to be conducted in a minimum amount of time to provide for the highest possible data throughput. The high data rates require that a large part of the Fibre Channel protocol be handled by hardware. Yet to keep implementation complexity low, it is desirable to implement only the simplest processes in hardware and to allow the more complex operations to be handled by software. The loop initialization process in particular is a somewhat complex procedure which could benefit from hardware support if the implementation complexity can be kept low.

SUMMARY OF THE INVENTION

The problems outlined above are in large part solved by a computer network having an efficient implementation of the loop initialization process. In one embodiment, the computer network comprises nodes coupled by unidirectional serial communications links in a ring topology. The nodes typically include a serial communications transceiver, a transmit controller, a receive controller, and a memory unit. The serial communications transceiver operates to drive transmit signals on the outgoing serial communications link and to buffer receive signals from the incoming serial communications link. The memory unit includes transmit and receive buffers that are coupled to the transceiver via transmit and receive controllers. One or more of the nodes may also include a control register having an "autoswap" bit. The autoswap bit is initially reset to 0 when the node enters the initialization mode. When the autoswap bit is set to 1, the transmit and receive buffers exchange roles after every data frame so that received initialization data frames stored in the receive buffer are retransmitted by the transmitter controller. When the autoswap bit is not set, a comparison between the original transmitted initialization data frame and the received initialization data frame is performed, and if it is determined that the received initialization data frame is less than the original transmitted initialization frame, the autoswap bit is set. Otherwise a check is made to determine if the two frames are equal, in which case the node determines that it has received its original transmitted initialization data frame and assumes the role of Loop Initialization Master. If the received initialization data frame is neither less than or equal to the original frame, then the original initialization data frame is retransmitted, and the cycle is repeated with the next received frame. This implementation advantageously reduces the retransmission latency of nodes in the loop and thereby reduces the propagation delay of the smallest initialization data frame around the loop, resulting in a smaller loop initialization time.

BRIEF DESCRIPTION OF THE DRAWINGS

Other objects and advantages of the invention will become apparent upon reading the following detailed description and upon reference to the accompanying drawings in which.

Figure 1:
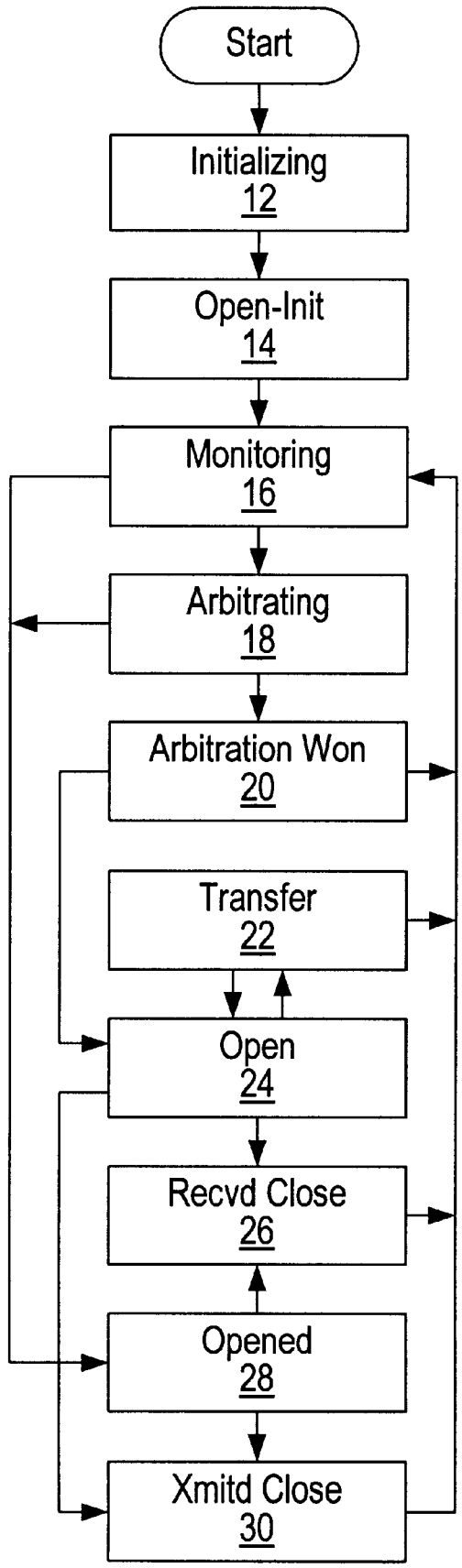
FIG. 1 shows a state machine illustrating behavior of a Fibre Channel port.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
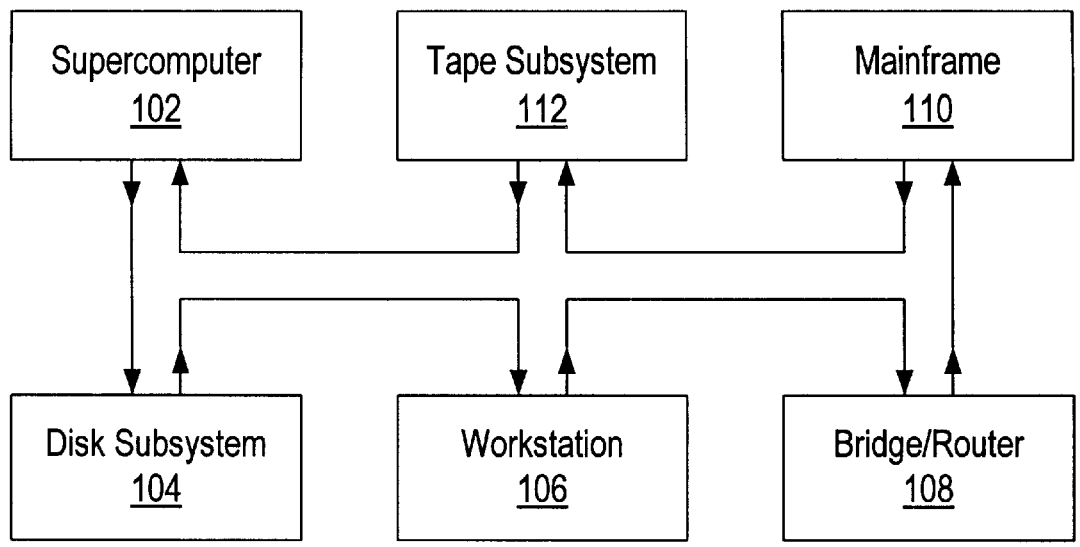
FIG. 2 shows a system network configured as an arbitrated loop.

FIG. 2 illustrates an exemplary system network having as nodes a supercomputer 102, a disk subsystem 104, a workstation 106, a bridge/router 108, a mainframe 110, and a tape subsystem 112. The nodes are coupled in an "arbitrated loop" topology, in which the transmit channel from one node is directly connected to the receive channel of the next node. In this topology, only one initiator-responder connection is supported at a time, with the rest of the nodes simply "passing along" anything they receive. The channels transport data frames and control words from a source node to a destination node. Using control words, an initiating node first arbitrates to get control of the loop, then notifies a responding node of its desire to transmit data frames. The initiating and responding node negotiate a mutually agreeable frame size, then the responding node provides a buffer credit to the initiating node for each data frame it has space to accommodate. Upon receipt of the buffer credits, the initiating node begins transmitting data frames, one per credit until the data has been sent.

Before data exchanges can occur, each node must be made aware of the loop addresses of the other nodes on the loop. The assignment and notification of addresses occurs during loop initialization. As discussed in the background of the invention, during the loop initialization, the nodes repeatedly transmit LISM data frames. The ports compare received LISM data frames to their native LISM data frame, and thereafter re-transmit the lesser of the two. A method for efficiently accomplishing this loop initialization phase is provided for the network interfaces of the loop nodes. A description of the operation of the network interfaces follows, and afterwards a mechanism for loop initialization is discussed.

The data frames moving between the initiating and responding node are organized in the following manner. Consecutive frames moving in the same direction form a sequence. A series of related sequences (in both directions) forms an exchange. Any given node may be participating in multiple concurrent exchanges, so a network interface unit receiving data frames must determine which exchange each data frame belongs to in order to track the progress of each exchange. Each data frame includes a frame header having (among other items) the following information: a destination address identifier (D_ID), the exchange identifier used by the exchange initiator (OX_ID), the exchange identifier used by the responder (RX_D), a sequence identifier (SEQ_ID) provided by the sequence initiator, and a frame number within the sequence (SEQ_CNT).

Figure 3:
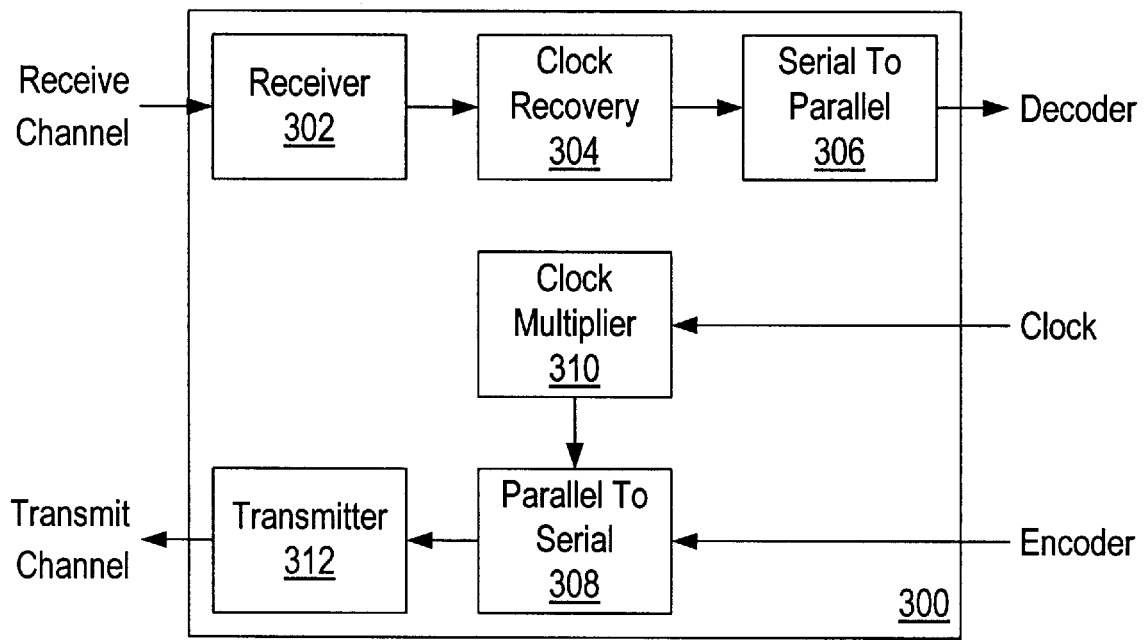
FIG. 3 shows a serial communication transceiver.

FIG. 3 illustrates a serial communication transceiver 300 that may be used by the nodes to couple to the serial communications link. Transceiver 300 includes a receiver 302 coupled to the receive channel to sense incoming signal levels, clean them up as much as possible, and provide them to a clock recovery module 304. Clock recovery module 304 uses the incoming signal to reconstruct a clock signal synchronized to the incoming data, and a serial-to-parallel converter 306 uses the reconstructed clock signal to convert the incoming signal from serial form to parallel form. In one embodiment, converter 306 outputs one 10-bit channel codeword at a time. The output from the converter 306 is sent to a decoder.

Transceiver 300 also includes a parallel-to-serial converter 308, which receives a stream of codewords from an encoder and uses a clock signal from clock multiplier 310 to convert the stream of codewords into a serial bitstream. Transmitter 312 then converts the serial bitstream into signals suitable for transport by the transmit channel. Transceiver 300 is typically provided on a network card, which resides on the I/O bus of a node. The interface between the transceiver 300 and the I/O bus is provided by a network interface unit such as that shown in FIG. 4.

Figure 4:
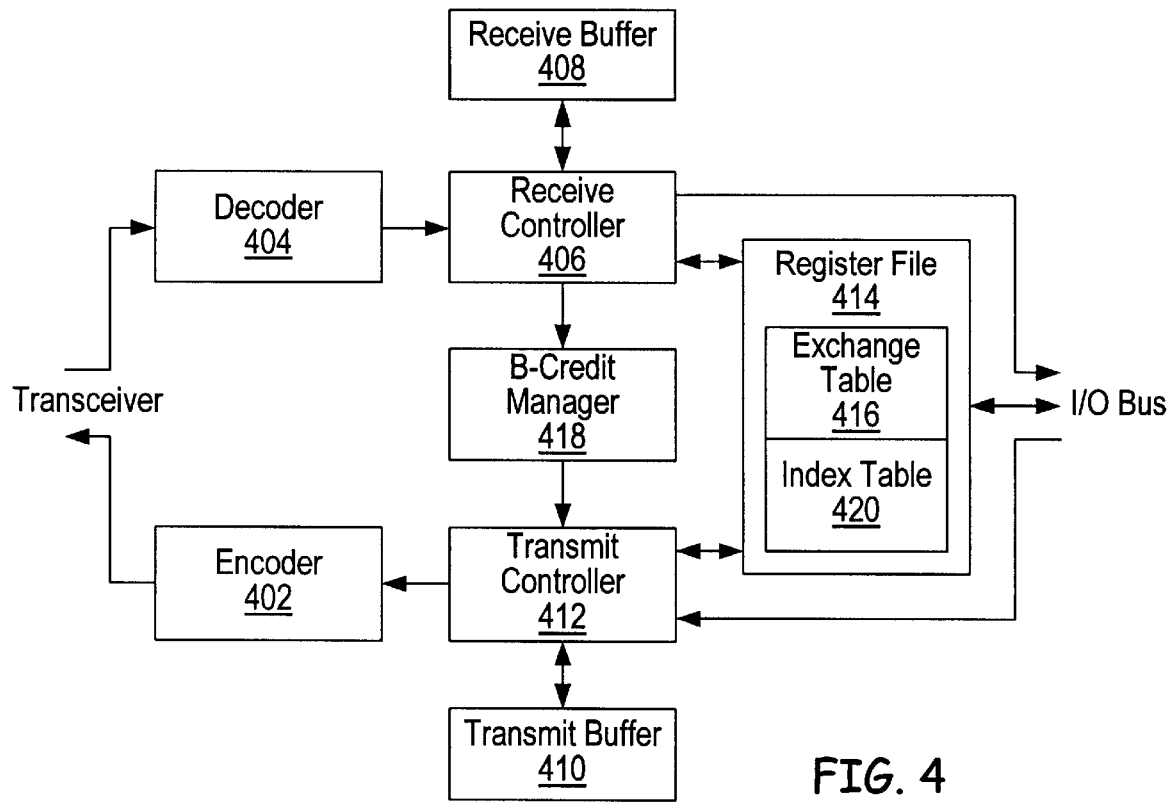
FIG. 4 shows a network interface unit, which uses indirect addressing to access an exchange table.

One embodiment of a network interface unit is provided in FIG. 4. It includes an encoder 402 and a decoder 404 coupled to the transceiver 300. Encoder 402 and decoder 404 provide error correction coding and decoding for information transmitted across the serial link. Decoded data from decoder 404 is provided to receive controller 406. The receive controller 406 stores received control words and data frames in receive buffer 408. If the node is in a "pass along" mode, the receive buffer 408 is also used as a transmit buffer 410. A transmit controller 412 retrieves control words and data frames from transmit buffer 410 and forwards them to encoder 402. If the node is transmitting or receiving data (i.e. participating in an exchange of data), receive controller 406 updates exchange information in register file 414 in response to received control words or data frames, and forwards data from received data frames to the node's i/o bus. Transmit controller 412 updates exchange information in register file 414 in response to commands and data from the node's i/o bus, generates control words and data frames in transmit buffer 410, and forwards them to encoder 402.

A processor at the local node may have access to register file 414 via the I/O bus. In one embodiment, the management of the network interface is done via a software driver resident in system memory. In this case, the incoming data and outgoing data may be written to and read from system memory via DMA (direct memory access) channels. The software driver determines when a data exchange is initiated or concluded, and maintains a list of concurrent data exchanges. Although there is no specified limit to the number of concurrent exchanges, it is likely that only a small number will be active (i.e. expecting that data frames for these exchanges will be sent or received in, say, the next 100 microseconds) at any given time. The processor stores tracking information for the active exchanges in an exchange table 416 in register file 414. To allow the receive and transmit controllers to quickly update the exchange tracking information, the processor also provides an index table 420 in register file 414. The index table 420 has an entry corresponding to each possible exchange number, and the value of the entries corresponding to active exchanges is set equal to the location of the tracking information in the exchange table 416. The receive or transmit controller needing to access or update the exchange table information can then first retrieve the exchange number from the frame header, reference the index table using this exchange number to determine the location of the tracking information in the exchange table, and then access or update the tracking information using the location provided. This advantageously provides a way for a large number of concurrent data exchanges to be efficiently supported using an exchange table of limited size. During its pendency, a data exchange may have its tracking information moved to and from system memory multiple times, and each time the exchange table slot that the information gets stored in may change. The controllers 406, 412 are able to track the changing exchange table slot since the location is updated in the index table every time the exchange changes from inactive to active.

Various methods for determining which of the concurrent exchanges are active may be used. The likelihood of processing frames may not be the only factor. Other factors may include node or task priority, predicted response time for data frames of an exchange, and limitations on numbers of simultaneously active exchanges of certain exchange types. If data frames for inactive data exchanges are received, the controllers will be unable to find the tracking information, and the frames may be rejected or replied to with a "Busy" control word so that the transmitting node is prompted to re-send the frame at a later time. Alternatively, the software driver may impose limitations on the concurrent exchanges to ensure that data frames for inactive exchanges are never processed, i.e. to ensure that the tracking information is always available for data frames being processed.

When using this arrangement, the assignment of the exchange numbers may be performed by retrieving available exchange numbers from a stack. Initially, all the exchange numbers are available, and as exchanges are initiated (either by the local node or by a remote node) exchange numbers are retrieved from the top of the stack. As exchanges are concluded, exchange numbers are returned to the bottom of the stack. Since little effort is involved and this occurs relatively infrequently, the assignment of exchange numbers may be accomplished by device driver software.

Many sequences may be initiated for each exchange, and it is desirable to provide a low-complexity method for hardware to assign a sequence ID number without the involvement of software. It is impractical to have software scan through all the active exchanges to determine a unique sequence ID number between the source and destination nodes. Since the exchange numbers locally assigned to the exchanges are already unique, mapping these numbers to sequence ID numbers ensures that the sequence IDs will be unique.

In one embodiment, the network interface supports 64 active exchanges. The sequence ID number is one byte, so setting the first six bits of the sequence ID to the exchange number leaves two bits unassigned. These two bits may then be assigned by the hardware of this embodiment in the following manner: sequences for the SCSI XFER_RDY command are assigned one hard-coded setting (e.g. 00), sequences for the SCSI RSP command are assigned a second hard-coded setting (e.g. 01), and data frame sequences alternate between the two remaining settings (e.g. 10 and 11). This assignment of sequence ID numbers is easily handled in hardware. In one embodiment, the remote exchange ID is used. In another embodiment, the originator exchange ID (OX_ID) is used.

Also shown in FIG. 4 is a buffer-credit manager 418. As described previously, before an initiating node can transmit a data frame to a responding node, it must first secure a buffer credit from that node. Consequently, when receive controller 406 receives a control word indicating that a remote node wishes to transmit data, the buffer credit manager 418 is enabled, and the transmit controller 412 begins transmitting buffer credit control words in response to a credit signal from buffer credit manager 418. At the beginning of an exchange, the receive buffer 408 is empty of data frames, and the buffer credit manager 418 is provided with the negotiated frame size and the receive buffer capacity, and it is expected to generate and manage a number of buffer credits equal to the receive buffer capacity divided by the frame size, with as little delay as possible.

Figure 5:
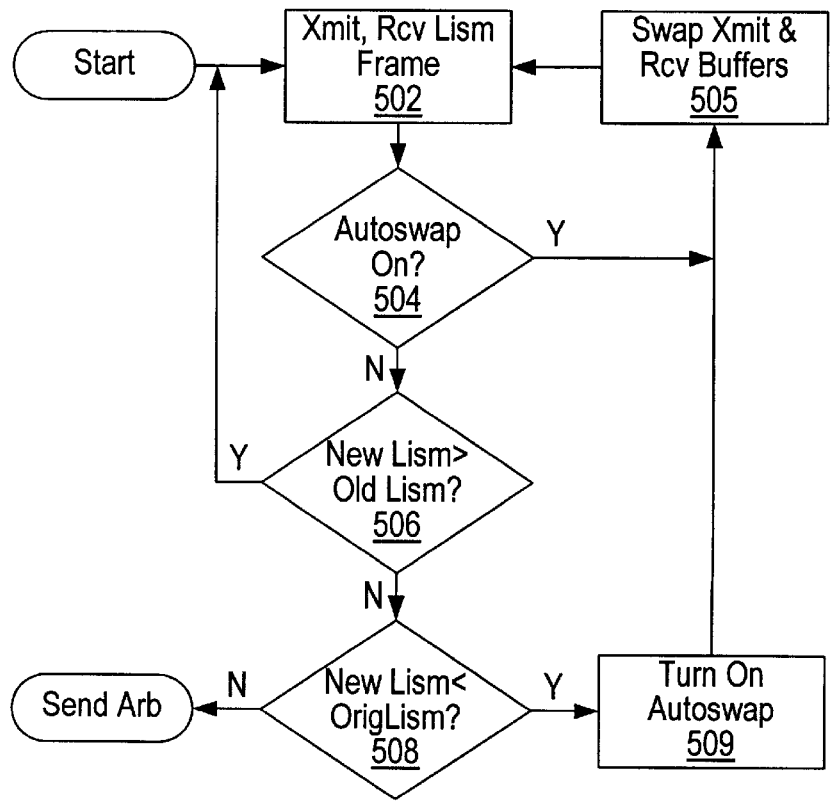
FIG. 5 illustrates a method of reducing the loop initialization burden on software.

Turning now to FIG. 5, a method of loop initialization is illustrated. An event causes the network interface to enter state 502. In state 502, the network interface transmit controller transmits an LISM data frame while at substantially the same time, the receive controller receives an LISM data frame. Upon the completion of both data frames, the network interface performs check 504. If an autoswap bit in the register file is set, transmit and receive buffers are "swapped" in state 505, and in state 502 the transmit controller retransmits the received LISM data frame from what used to be the receive buffer and the receive controller stores the incoming LISM data frame in what used to be the transmit buffer. If check 504 is negative, in one embodiment, the network interface asserts an interrupt to the processor so that the software driver can perform the comparison in check 506. In check 506, the processor determines if the received LISM data frame is greater than the native LISM data frame. If it is, then the network interface continues in state 502, retransmitting the native LISM data frame and receiving the next incoming LISM data frame. Otherwise, if check 506 is negative, then the processor determines if the received LISM data frame is less than the native LISM data frame in check 508. If this occurs, then it is known that another node on the loop will become the Loop Initialization Master. Consequently, the processor sets the Autoswap bit in step 509, causing the network interface to move in a cycle of steps 502, 504 and 505 until the next phase of the loop initialization begins with the Loop Initialization Master taking control of the loop. If check 508 is negative, then the received LISM data frame is the same as the native LISM data frame, and the processor determines that the node is now the Loop Initialization Master As the Loop Initialization Master, the node arbitrates for control of the loop by sending an ARB Transmission Word.

Advantageously, this cycle of steps 502, 504, 505 requires no software interaction, and the latency between the receiving and re-transmitting of an LISM data frame is greatly reduced. Further, in a random ordering of nodes, most of the loop nodes will quickly enter this cycle, thereby increasing the overall LISM data frame propagation speed around the loop. In one embodiment the time necessary for the receiving or transmitting of an LISM data frame is one fifth of the time needed for a processor to be interrupted and complete the comparison of two LISM data frames. Eliminating up to ⅘ of the retransmission delay at each node greatly reduces the time required for loop initialization. In networks sensitive to breaks in received data streams such as those that might be caused by loop re-initializations due to transmission errors, the reduced initialization time will allow smaller buffers to be used, and consequently provide a reduce system cost. An example of such a network would be one supporting video transmission. To prevent momentary breaks in the communications link from causing glitches which may be detected by a viewer, data buffers are used. The size of the buffers is strongly dependent on the maximum break duration which must be concealed.

Variations on the method of FIG. 5 are readily recognizable. The comparisons made by the processor in checks 506 and 508 may be reordered and restated. Numerous other variations and modifications will become apparent to those skilled in the art once the above disclosure is fully appreciated. It is intended that the following claims be interpreted to embrace all such variations and modifications.

What is claimed is:

1. A computer network which comprises a plurality of nodes coupled by unidirectional serial communications links in a ring topology, wherein the plurality of nodes includes one or more nodes having a network interface which comprises:

a serial communications transceiver for driving transmit signals on an outgoing serial communications link and for buffering receive signals on an incoming serial communications link;

a transmit controller coupled to provide the transmit signal to the serial communications transceiver;

a receive controller coupled to receive the receive signal from the serial communications transceiver;

a memory unit coupled to the transmit and receive controllers and configured to contain a transmit buffer and a receive buffer, a control register coupled to the transmit and receive controllers, wherein the control register includes an autoswap bit that is reset when the network interface enters an initialization mode;

wherein the transmit controller generates an original initialization data frame in the transmit buffer when the network interface enters the initialization mode;

wherein while the network interface is in the initialization mode, the transmit controller repeatedly transmits initialization data frames present in the transmit buffer, wherein while the network interface is in the initialization mode, the receive controller stores received initialization data frames in the receive buffer, wherein the transmit and receive buffers are configured to exchange roles upon completion of the transmission and reception of initialization data frames if the autoswap bit is set.

2. The computer network of claim 1, wherein the receive controller is coupled to a processor to notify the processor when an initialization data frame is received and the autoswap bit is not set.

3. The computer network of claim 2, wherein the processor is configured to compare the received initialization data frame to the original initialization data frame and is coupled to the control register to set the autoswap bit if the received initialization data frame is algebraically less than the original initialization data frame.

4. The computer network of claim 2, wherein the processor is configured to compare the received initialization data frame to the original initialization data frame and is coupled to the transmit controller to arbitrate for control of the loop if the received initialization data frame equals the original initialization data frame.

5. The computer network of claim 2, wherein the processor is configured to compare the received initialization data frame to the original initialization data frame and is coupled to the transmit controller to retransmit the original initialization data frame if the received initialization data frame is algebraically greater then the original initialization data frame.

6. A network interface which comprises:

a control register which includes an autoswap bit that is reset when the network interface enters an initialization mode;

a memory unit having two buffers which are configurable as transmit and receive buffers;

a receive controller configured to receive initialization data frames and coupled to the memory unit to store received initialization data frames in one of the two buffers;

a transmit controller configured to transmit initialization data frames and coupled to the memory unit to retrieve initialization data frames for transmission from one of the two buffers;

wherein the transmit and receive controllers are coupled to the control register to detect the state of the autoswap bit;

wherein when the autoswap bit is set, the transmit and receive controllers prior to transmission of initialization data frames switch their access to the one of the two buffers previously used by the receive controller and transmit controller, respectively.

7. The network interface of claim 6, further comprising a serial communications transceiver coupled to the transmit controller for driving transmit signals on an outgoing serial communications link and coupled to the receive controller for buffering receive signals on an incoming serial communications link.

8. The network interface of claim 6, wherein if the autoswap bit is not set, the control register is configured to notify a processor when an initialization data frame is received by the receive controller.

9. The network interface of claim 8, wherein the processor is configured to examine the received initialization data frame and is coupled to the control register to set the autoswap bit if the processor determines that the received initialization data frame is algebraically less than an original initialization data frame.

10. The network interface of claim 8, wherein the processor is configured to examine the received initialization data frame and is configured to determine loop addresses for remote nodes on a loop if the processor determines that the received initialization data frame equates to an original initialization data frame transmitted by the network interface.

11. A method for a network node to participate in a network determination of loop addresses, wherein the method comprises:

generating an original initialization data frame in a transmit buffer, wherein the original initialization data frame contains a hard-coded port name;

transmitting initialization data frames from a first of two buffers;

receiving initialization data frames and storing received initialization data frames in a second of two buffers;

examining an autoswap bit in a control register, if the autoswap bit is set, switching the two buffers so that the received initialization data frame is retransmitted.

12. The method of claim 11, further comprising:

if the autoswap bit is not set, determining if the received initialization data frame is algebraically less than the original initialization data frame;

setting the autoswap bit if the received initialization data frame is less than the original initialization data frame.

13. The method of claim 11, further comprising:

if the autoswap bit is not set, determining if the received initialization data frame is equal to the original initialization data frame;

arbitrating for control of the loop if the received initialization data frame equates to the original initialization data frame.

14. The method of claim 11, further comprising:

if the autoswap bit is not set, determining if the received initialization data frame is greater than the original initialization data frame;

retransmitting the original initialization data frame if the received initialization data frame is greater than the original initialization data frame.

15. The method of claim 11, further comprising:

interrupting a processor if the autoswap bit is not set after an initialization data frame is received;

the processor comparing the received initialization data frame to the original initialization data frame;

the processor setting the autoswap bit if the received initialization data frame is less than the original initialization data frame.

* * * * *